Figure 1:
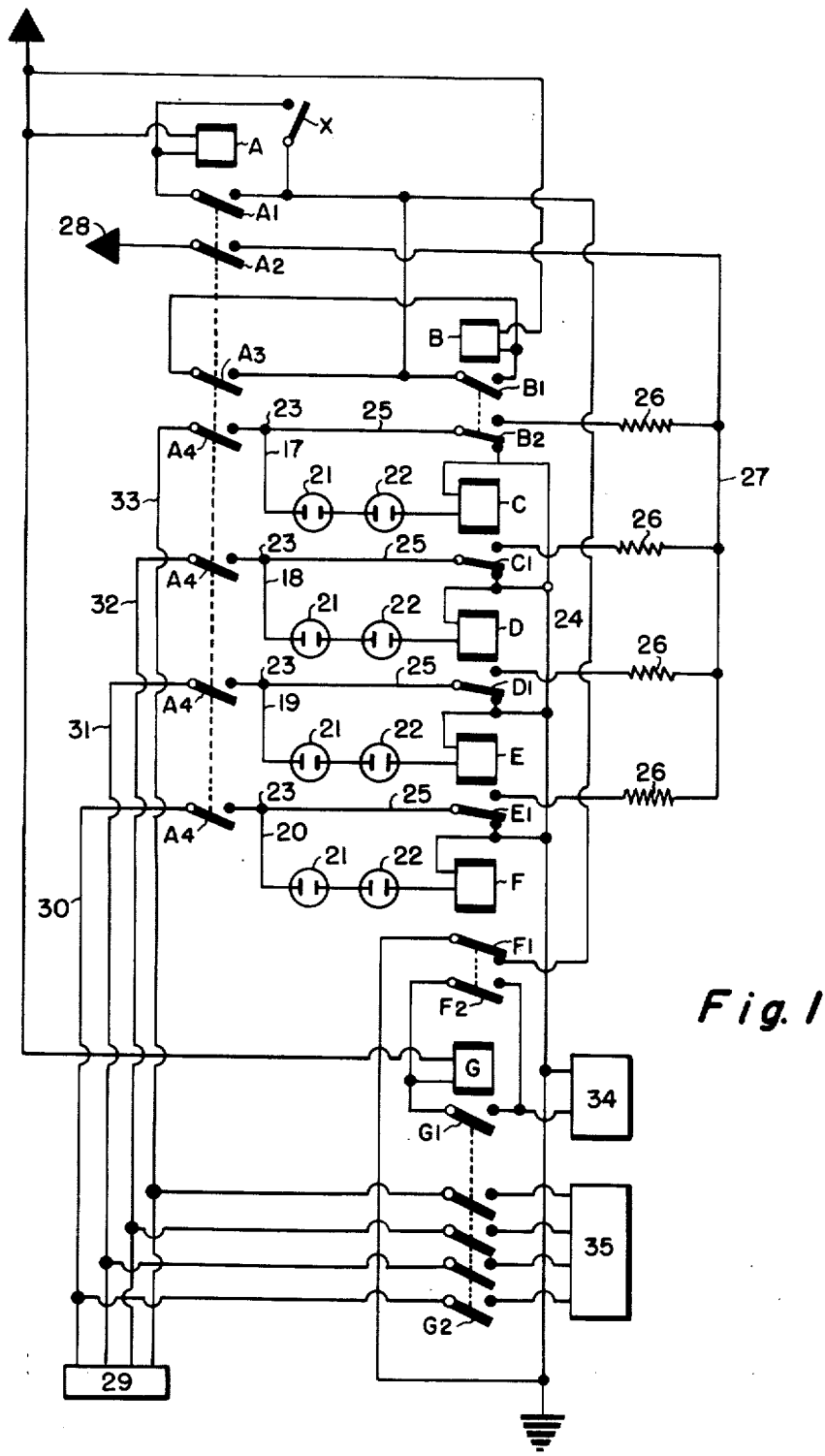

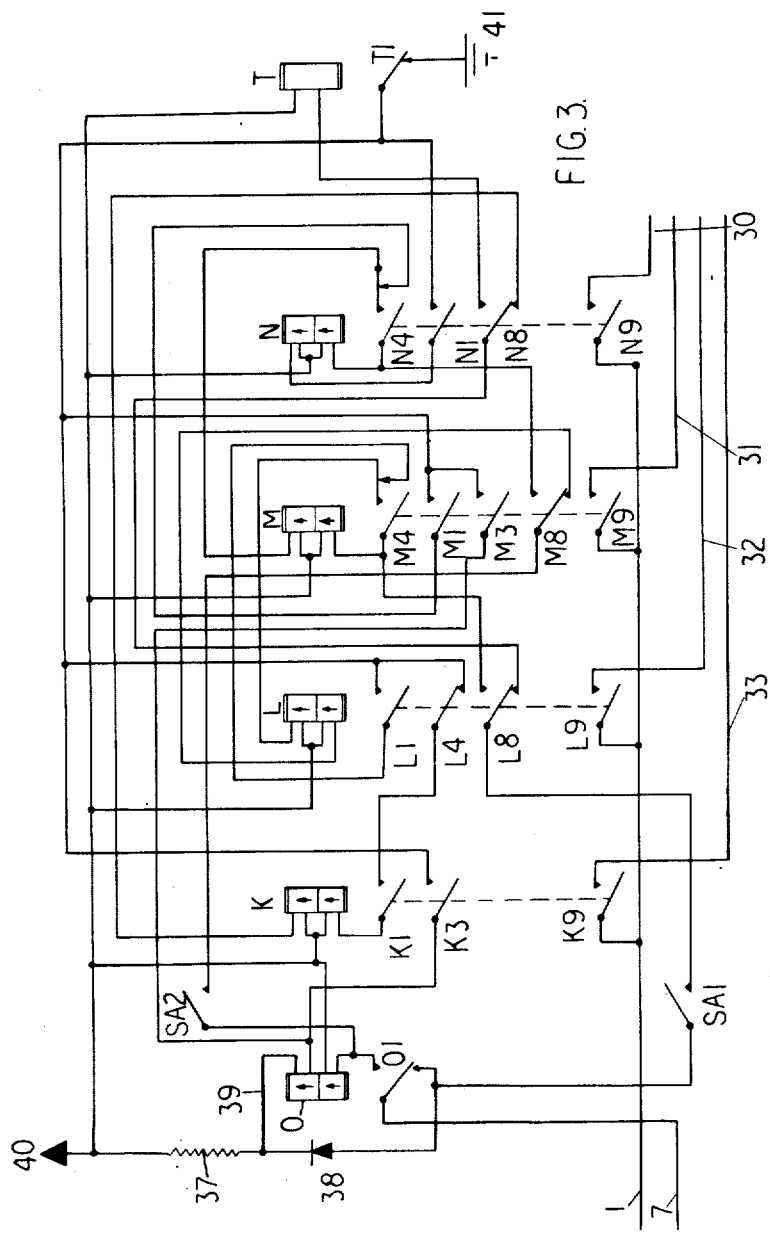

2,805,391
Patented Sept. 3, 1957

2,805,391

TESTING OF THE INSULATION OF ELECTRIC CONDUCTORS

Stanley George Meadows, Hornchurch, Lister Hallas, Romford, Anthony Herbert Coppard, Hornchurch, and George Harry King, Ilford, England, assignors to Southern United Telephone Cables Limited, Dagenham Dock, Essex, England, a British company Application May 25, 1953, Serial No. 356,973

Claims priority, application Great Britain May 23, 1952

7 Claims. (Cl. 324—54)

This invention relates to apparatus for the testing of electric conductors by the application of a voltage to the conductor for the purpose of ascertaining the soundness and/or measuring the resistance of the insulation of the conductor from earth or adjacent conductors. The invention applies to the cases where a number of conductors are to be tested in sequence. It provides for rapid automatic testing in such cases.

In each test of soundness of insulation a voltage is applied to the conductor through a series resistance resulting in the actuation of a voltage-responsive signal device connected to the conductor to indicate that the insulation is sound. The conductor normally is electrically isolated from its surroundings so that no appreciable drop of voltage should occur when the test is applied. The signal device is designed to operate at a voltage not greatly inferior to the test voltage and is not actuated if there is any substantial drop of voltage due to leakage of the applied charge through a fault. The device is such that its actuation is accompanied by the passage of a current through it.

In each test in which the resistance of the insulation of the conductor is measured, the conductor is placed in series with a test resistance of predetermined value and charged for a fixed time at a known potential and is then transferred to a circuit in which it is again connected with an identical test resistance. In this circuit a fixed potential difference is applied to the insulation resistance and the test resistance in series and the junction between them is connected to the grid of an electrometer valve so that the latter is responsive to the potential at the junction between the two resistances. In this way the potential applied to the grid is made to serve as a measure of the insulation resistance because the potential at the junction between the insulation resistance and the test resistance will fall as the insulation resistance falls. The output from the electrometer valve is amplified and is applied to a trigger circuit or is made in other manner to actuate an indicator.

In applying the invention to testing in either of these ways the apparatus is arranged so that the result of the test of each of a set of conductors which attains the desired condition or standard is the actuation of means for applying the test voltage to the conductor next in sequence. This process continues through the set of conductors to be tested. If a failure occurs, the process stops, since the device for applying the test voltage to the next conductor is not actuated. The position of the termination of the process is then ascertained by reference to the operated signal devices. In the case of the test for soundness the location is ascertained by noting the signal device last operated. In the case of measurement of resistance, it can be arranged that the signal device is actuated either at the attainment of the desired value or on the failure to reach that standard. The latter is preferable. It is advantageous for the signal to be visual.

In the testing of the insulation of conductors relative to earth, earth is usually represented by the sheath, shield or casing in which the conductor is housed and this is connected to the return side of the source of test voltage. Where the conductors of a set to be tested are located in close proximity to each other so that faults may occur between them all the conductors of the set except the one under test are connected by the test apparatus to the return side of the source of test voltage and the automatic switching of the test voltage is accompanied by the removal of the connection of the conductor to be tested from this return. This connection is arranged so as to short-circuit the signal device and the relay or other switching member connected to this conductor.

The testing in accordance with the invention may be made continuous by arranging a cyclic procedure for the automatic replacement of tested conductors by others to be tested and the arrangement for the actuation of the first testing circuit of the set by the signal device of the last circuit of the set. Alternatively, the testing may proceed by dealing with separate batches of conductors when the actuation of the last signal device of the set does not restart the process. It may, however, be used to put into action apparatus for making other tests on the same batch of conductors.

The invention is found described with reference to the accompanying diagrammatic drawing which represents two forms of the improved apparatus for testing the quads of a communication cable. A quad consists of four insulated wires and a quad is treated as a batch for testing. For the purpose of the test one end of each of the wires is connected to a separate terminal of the test apparatus, the other ends are, of course, insulated. The wires of adjacent quads and the sheath of the cable are connected to earth.

Figure 2:
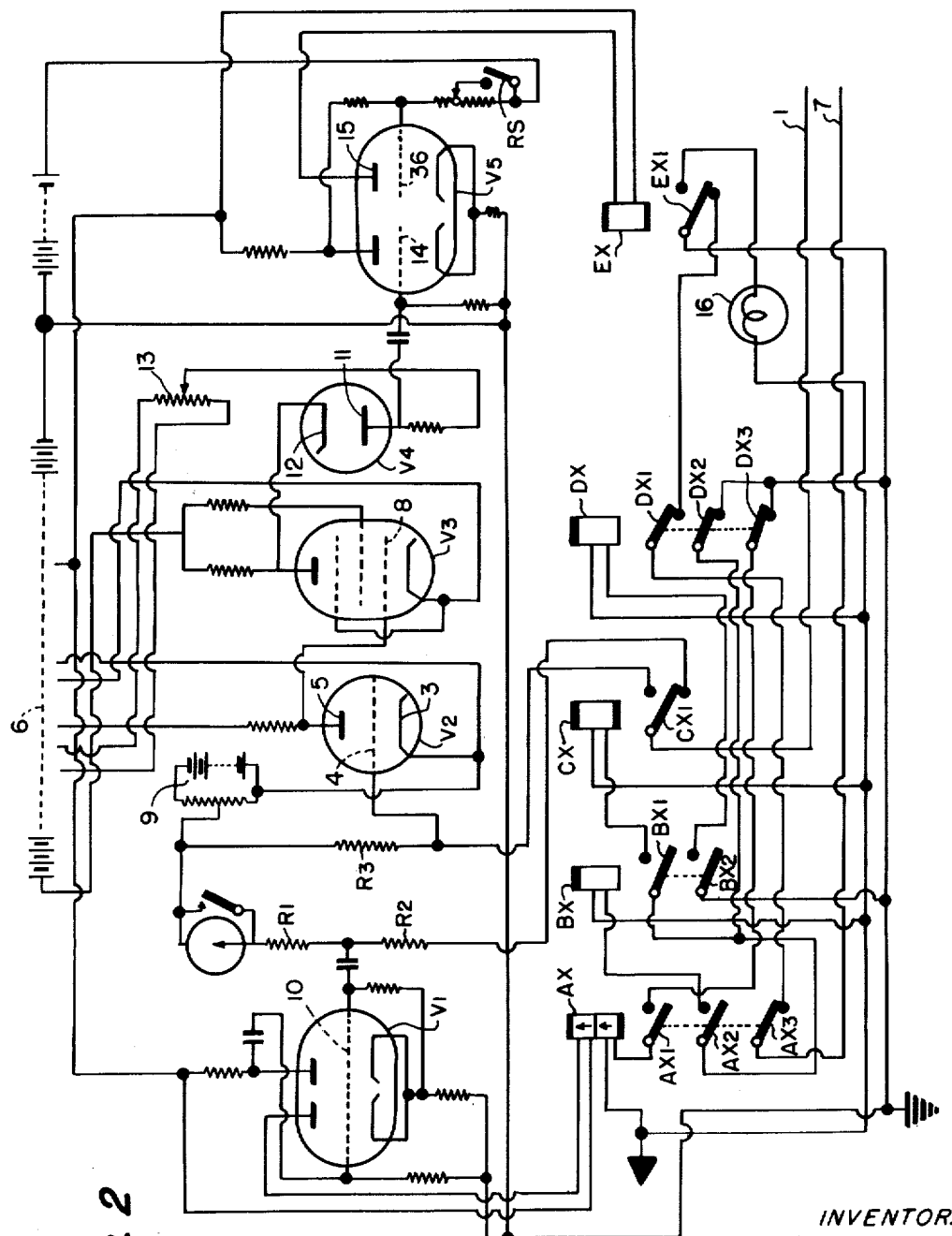

In the drawings Figure 1 is an arrangement for testing the soundness of the conductor insulation and Figures 2 and 3 together represent an arrangement for indicating in addition that the insulation resistance has a value not less than a predetermined minimum.

The apparatus in Figure 1 contains four branches 17—20 each containing a relay C, D, E or F respectively, and two neon lamps 21 and 22 in series between an input terminal 23 and an earthed bus-bar 24. Each branch also comprises a connection 25 by-passing the relay and lamps and ending in a two-way switch, B2, C1, D1 or E1, the normal position of which as shown connects the by-pass connection 25 to the earthed bus-bar 24. The relays and lamps are, accordingly, normally short circuited. The upper contacts of the two-way switches are connected, each through a fixed resistance 26, to a bus-bar 27 which can be made the source of test voltage by the closure of a switch A2 to connect the bar to a terminal 28 of a source of test voltage. The other terminal of the test voltage source will be connected to earth. Four insulated wires to be tested will be terminated in a four-way terminal 29 from which extend four line bus-bars 30—33. These bus-bars may be each connected, through one of a group of four switches A4—A4 to one of the test branch terminals 23. The switches A4—A4 are closed by closing a switch X to energize a relay A which is held by switch A1 and at the same time closes a switch A2 to make the bus-bar 27 alive. A switch A3 is also closed to energize a relay B which is held by switch B1 and also moves the switch B2 to connect the first line bus-bar 33 to a resistance 26. This applies the test voltage to the first wire connected to the line bus-bar 33. If the insulation of this wire is sound the wire is charged (the wire with its insulation and the remaining conductors in the cable acting as a condenser) to a potential at which the neon lamps 21 and 22 strike and current flows through them and the relay C in series with them to earth through bus-bar 24. The two-way switch C1 of the next branch circuit of the next line bus-bar 32 is actuated by this first relay C so that the passage of current through this relay C at once provides the circuit which applies the test voltage to this second line bus-bar 32. If the insulation of the wire connected to the bus-bar 32 is sound the second set of signal lamps 21 and 22 light up and the second relay D is energized to apply the test voltage to the third wire line bus-bar 31 by reversing switch D1. Again if the associated wire insulation is sound the next set of lamps are actuated and the test voltage is applied by relay E and switch E1 to the fourth line bus-bar 30, lighting up the final set of lamps and actuating the final relay F if there is again no fault. This opens switch F1 which releases the relays A and B to disconnect the wires under test from the apparatus by opening switches A4—A4, to isolate the live bus-bar 27 from the supply terminal 28 by opening switch A2, and to release all the relays C to F. Release of relay F recloses switch F1 but relays A and B will be unaffected until the manually operated start switch X is again closed.

If any of the wires connected to the line bus-bars has faulty insulation there will be a current flowing in the associated series resistance 26 and a potential drop at the terminal 23. The potential across the associated lamps 21, 22 will thus be insufficient to cause them to strike. There will consequently be no current through the relay in series with those lamps and the process of testing will stop. The condition of the lamps will give a visual indication of the position of the fault. For instance, if the insulation of the wire connected to the third line bus-bar 31 is faulty, this will be made evident by the fact that only the lamps for the first and second line bus-bars 33 and 32 are glowing. The switches A2, A4 and B2 may, of course, be hand-operated, but where automatic testing is required some relay system is essential. The pair of relays A and B constitutes a simple arrangement given merely by way of illustration. The final relay F may also be used to initiate further testing operations on the four wires by energising at switch F2 a relay G. This may for instance close a switch group G2—G2 to connect the four line bus-bars 30—33 to other testing equiment indicated by the rectangle 35. Other suitable controls, represented by the rectangle 34 in the operating circuit of relay G, may be used to connect another group of insulated wires to the line bus-bars 30—33 for insulation testing. The relay G is conveniently a time delay relay to ensure that switches G2—G2 will not close until the line bus-bars 30—33 have been isolated from the insulation tester by the opening of switches A4—A4.

In the arrangement shown in Figure 2 the conductors to be tested for insulation resistance are connected in sequence to an input terminal 1 by the arrangement shown in Figure 3 and an output signal is supplied to the circuit of Figure 3 from an output terminal 7 unless the insulation is faulty. Through a two-position relay-operated switch CX1 the conductor connected to the input terminal 1 is placed in series with a resistance of predetermined value, consisting of two series-connected resistors R1 and R2, and charged for a fixed time at a known potential. At this stage the switch CX1 is in its normal, that is non-operated, lower position as shown. After a predetermined interval of time the switch CX1 is moved to the upper position in which the same potential is applied through terminal 1 to the conductor through another resistor R3 identical with the sum of the first mentioned resistors R1 and R2. The junction between the upper contact of switch CX1 and the resistor R3 is connected to the grid 4 of an electrometer valve V2. The potential applied to that grid 4 is a measure of the current flowing through resistor R3 into the conductor insulation and this will serve as a measure of the insulation resistance. The output from the anode 5 of the electrometer valve V2 is applied to the grid 8 of an amplifier valve V3 and the output from this valve is fed to a diode V4. If the voltage drop across the resistor R3 is sufficient the diode V4 will conduct and cause a trigger valve V5 to energise a relay EX. This relay EX is used to indicate a faulty insulation resistance.

The charging potential is derived from an appropriate tapping, say 500 volts, on a D. C. source of potential 6 and applied to the cathode 3 of the electrometer valve V2. From this cathode 3 the two resistor leads, namely the one containing resistors R1 and R2 in series and the other containing resistor R3, are fed through a biasing device 9 which is adjustable to provide the required potential bias on the electromotor valve V2. The common point of connection between the series resistor R1 and R2 is connected to one grid 10 of a single-shot multi-vibrator valve V1. The initial charging of the capacity of the conductor under test with respect to earth through the resistors R1 and R2 causes a negative pulse to be applied to this grid 10. The circuit constants of the valve V1 are so arranged that this pulse on one side of the valve produces in a quick-acting double winding relay AX in the anode circuit of the other side of the valve a current pulse of sufficient duration to energise the relay. The relay AX is held by closing its own switch AX1 which is in series with a normally closed switch DX3 in a holding circuit. The relay AX also closes a switch AX2 to energise a time delay relay BX, and also opens a switch AX3 in the circuit to the output signal terminal 7. The delay period of the time delay relay BX determines the charging period (which may be one second) of the insulated conductor. At the end of that period relay BX operates to close switch BX1 which completes a circuit to energise a quick-acting relay CX, and also closes a switch BX2 which completes a circuit to energise a time delay relay DX. Relay CX operating before the time delay relay DX quickly alters the position of switch CX1 to disconnect the input terminal 1 from the resistor R2 and connect it to the junction between the resistor R3 and the grid 4 of the electrometer valve V2. Any leakage current through the insulation of the conductor under test now flows through resistor R3 and produces a potential drop across the resistor which is measured by the electrometer valve V2 and amplified by valve V3. By appropriately selecting, by means of a potentiometer 13, the potential of the anode 11 of the diode V4 in relation to the potential of its cathode 12, the diode V4 can be set to conduct when its cathode potential falls to a predetermined value representing a minimum allowable value of the conductor insulation resistance. When the diode V4 conducts, a negative pulse is fed from its anode 11 to one grid 14 of a two-state trigger valve V5. The circuit connections of this valve V5 are such that in the normal state one half, including the grid 14, is slightly conducting and the other half, including an anode 15, is not conducting. The negative pulse on the first grid 14 produces a regenerative action causing the valve to revert to a second stable state in which the second half conducts. This energizes a quick-acting relay EX in the circuit of the second anode 15. This relay EX alters the position of a two-way switch EX1 which in its normal position completes part of the circuit to the signal output terminal 7. In its operated position switch EX1 interrupts the circuit to the output terminal 7 and completes a circuit to a signal lamp 16 which by lighting gives visual indication of a faulty insulation.

The circuit to the output terminal 7 is complete only when the two-position switch EX1 is in the normal lower position and switches AX3 and DX1 are in the normal closed position. All these switches are in series so that the opening of any one of them prevents an output signal being given. As already explained, switch EX1 moves to the upper position in the event of a fault, thus breaking the signal output circuit and causing the fault indicating lamp to light. The relay EX controlling switch EX1 remains energized until the operator closes a re-setting switch RS to short circuit part of the resistance in the grid 36 associated with the anode 15 of the valve V5. In the event of there being no fault to be indicated, the relay EX will not be energized and switch EX1 will remain in its normal position. The switch AX3 was opened by the energization of relay AX at the start of the operation. The time-delay relay DX does not operate until after the time at which switch EX1 would be changed if there was a fault to be indicated. When relay DX operates it opens three switches DX1, DX2 and DX3. The first of these, switch DX1, interrupts the circuit to the signal output terminal 7. The second switch DX2 opens the circuit through switch BX1 to relay CX and this relay is released and the associated two-way switch CX1 returns to its initial position. The switch DX2 also opens the circuit through switch AX2 to time-delay relay BX. The third switch DX3 opens the holding circuit for relay AX through switch AX1 and relay AX is released. This allows the switch AX3 to reclose. The release of the time-delay relay BX allows switch BX2 to open to break the circuit to the time-delay relay DX and this releases after a slight delay to reclose all its associated switches including switch DX1. Provided that the conductor insulation resistance is above the predetermined minimum value the diode V4 will not conduct so that relay EX has not operated. There is now completed a circuit through switches EX1, DX1 and AX3 to the signal output terminal 7. The purpose of the switches DX1 and AX3 is to ensure that there will be no output from the terminal 7 until the test is completed and particularly that there is no output giving a false result before the operation of the relay EX due to a fault. Although in the event of a fault the reclosing of switch CX1 will re-apply the testing condition the final relay will remain operated to indicate a fault until the resetting switch RS is closed by the operator.

The output from the terminal 7 is used to control the arrangements shown in Figure 3 to disconnect the conductor which has been tested and connect to the apparatus the next conductor in the sequence. This arrangement controls the connecting of several insulated conductors in sequence to the testing circuit shown in Figure 2 and is similar to that described and shown in Figure 3 of the specification of our U. S. patent application Serial No. 418,145. The operation of the arrangement shown in Figure 3 is now described in more detail.

The output terminal 7 and the input terminal 1 already referred to in connection with Figure 2 are also shown in the bottom lefthand corner of Figure 3. For the purpose of the description of Figure 3 these are referred to as the insulation test terminal 1 and the test complete terminal 7. The arrangement includes five double wound relays O, K, L, M and N and a single wound relay T. The relays are permanently connected on one side to a common voltage source represented diagrammatically by a solid triangle 40 and their operating or holding circuits are completed by a connection either to a common earth 41 or to the earth terminal shown in Figure 2. The latter connection is made through the test complete terminal 7 when switches AX3, DX1 and EX1 are in the normal position shown in Figure 2.

Four line bus-bars 30—33 are intended to be connected to the four insulated wires of a telephone cable quad to be tested in the manner described in connection with Figure 1. Four of the double-wound sequence relays K, L, M and N operate four switches K9, L9, M9 and N9 to connect each line bus-bar 30—33 in turn to the insulation test terminal. It is the opening and closing of the connection from the test complete terminal 7 through the switches AX3, DX1 and EX1 to earth which provide pulses for controlling the sequence relays K—N. At the commencement of testing all the switches AX3, DX1 and EX1 are in the normal position, the required voltages are applied to the apparatus, and two manually operated switches SA1 and SA2 in Figure 3 are closed. From the test complete terminal 7 there is a circuit through a two-way switch O1 in its lower, normal position, switch SA1, switch L8 and switch N8 to energize sequence relay K. This closes all the switches K1, K3 and K9, and the last mentioned switch connects the line bus-bar 33 to the insulation test terminal 1 to present for testing the conductor connected to line 33. Relay K is held operated by a holding circuit completed through switches K1 and L4.

The two-way switch O1 is controlled by the double-wound relay O. The closing of switch K3 has completed an operating circuit for this relay O through a lead 39 and a resistor 37 but relay O does not operate because there is a shunt circuit through the connection 38 to earth through the test complete terminal 7. Immediately the testing operation starts, switch AX3 opens and breaks the earth connection to terminal 7. This opens the shunt circuit through connection 38 and allows relay O to operate and to be held operated by switch K3. This moves the two-way switch O1 into the upper position.

If the test is unsatisfactory the opening of EX1 prevents a circuit being reclosed to the test complete terminal, and the automatic operation of the apparatus ceases until attended to by the operator. If the test is satisfacory, the circuit to the test complete terminal 7 is reclosed and relay L is operated through switches O1, SA2, and M8. A holding circuit for relay L is completed by switches L1 and M4. Switch L9 is closed to connect the next line bus-bar 32 to the insulation test terminal 1 and switch La is opened to break the holding circuit to relay K. This relay K releases to open switch K9 and isolate the tested line bus-bar 33. An operating circuit to the next relay M is prepared by the changeover of switch L8 to the upper position, the circuit which was made by this switch L8 in the lower position being broken so that the first relay K will not be re-operated when switch O1 returns to the lower position. Switch K3 in the holding circuit for relay O has opened on the release of relay K so that on the next opening of switch AX3, relay O is released and switch O1 returns to the lower position.

On satisfactory completion of the second test relay M is energized over the circuit from the test complete terminal 7 through switch O1, switch SA1, and switch L8 in the upper position. This relay M is held by a circuit through switch M1. Also the hold line of relay L through a make-before-break switch M4 is transferred to the operating line of relay M. Switch M3 has closed to complete the operating circuit to relay O so that when the circuit to the test complete terminal 7 is next broken by the opening of switch AX3, the shunt circuit through the rectifier 38 will be broken and relay O will operate to change switch O1 to the upper position. This breaks the holding circuit for relay L through switches O1, SA1, L8 and M4. This relay L will then release to open switch L1, close switch L4 and allow switch L8 to return to the lower position. These switch movements do not cause any other relays to operate because the switches are all in circuits broken at other points. Switch L9 also opens to disconnect the line bus-bar 32 from the insulation test terminal 1 to which the next line bus-bar 33 is connected by the closing of switch M9. The movement of switch M8 to the upper position prepares a circuit for operating the next sequence relay. This relay N operates at the successful termination of the next test over a circuit through switches O1, SA2 and M8. Relay N is held by a circuit through switch N1. The movement of make-before-break switch N4 changes over the holding circuit for relay M to the operating line for relay N through switches M8, SA2, and O1. Switch N8 moving to the upper position prepares a circuit for operation of relay T and switch N9 connects the fourth line bus-bar 30 to the insulation test terminal 1.

The next opening of switch AX3 breaks the holding circuit for relay M which releases to return the switches M1, M4, M3, M8 and M9 to normal, M9 disconnecting line bus-bar 31 from the testing apparatus. Relay O being released at the same time allows switch O1 to return to the lower position. At the conclusion of the fourth test, the circuit is again completed to the test complete terminal 7 and relay T operates. This opens switch T1 which disconnects the common earth terminal 41 from all the relays in Figure 3 and consequently returns all the relay controlled switches to the normal position shown.

In alternative arrangements of the circuit shown in Figure 2 certain modifications may be made. For instance in place of the time delay relay BX a known form of electronic timer may be used to facilitate the adjustment of charging period accurately to any desired value. Also the electrometer valve V2 and/or the amplifier valve V3 may be replaced by a two-valve device in each case where increased stability of operation is desired.

What we claim as our invention is:

1. Apparatus for testing the soundness of the insulation to earth of a group of insulated conductors one at a time and in sequence, comprising a source of test voltage of which one pole is earthed, a resistor of predetermined value, and means for connecting said resistor in series between each conductor and the other pole of the voltage source, a relay and a gas-discharge lamp connected in series to earth from the junction of a conductor and said resistor, and switching means operable by the relay to transfer the said other pole of the voltage source from a tested conductor to the next conductor when the potential at the junction between the conductor under test and the resistor is at least equal to the striking voltage of the lamp.

2. Apparatus as claimed in claim 1, in which there is a relay operated indicator for signalling the satisfactory testing of the last conductor of the group.

3. Apparatus for testing the soundness of the insulation to earth of a number of insulated conductors singly and in sequence, comprising a source of test voltage of which one pole is earthed, a resistor, switching means for connecting the said resistor in series between the unearthed pole of said source and one of said conductors, an electric circuit element responsive to the potential across the resistor, other switching means for connecting the unearthed pole of said source to another of said conductors, said other switching means being controllable by said circuit element to be operative when the potential drop across said resistor is less than a predetermined value.

4. Apparatus as claimed in claim 3, in which there is provided timing means for determining the initial charging period of an insulated conductor, an electrometer valve and means for applying to the valve the potential at the junction between said conductor and said resistor, and an indicator adapted to be operated by the output voltage of the valve when that potential is below a predetermined minimum value at the end of the predetermined charging period.

5. Apparatus as claimed in claim 3, in which there is provided timing means for determining the initial charging period of an insulated conductor, an electrometer valve and means for applying to the valve the potential at the junction between said conductor and said resistor, an indicator, a diode valve connected between the output terminal of the electrometer valve and said indicator, and means for biasing the diode valve to block the passage of a signal from the electrometer valve to the indicator when the potential at the junction between said conductor and said resistor is above a predetermined minimum value.

6. Apparatus as claimed in claim 3, in which there is provided timing means responsive to the initial current flow through said resistor to determine the initial charging period of an insulated conductor, a second resistor equal in value to said resistor, switching means operable by said timing means at the end of the charging period to transfer the circuit from said conductor to said source of test voltage through said second resistor, an electrometer valve with its input terminal connected to the junction between said second resistor and said conductor, and an indicator operable by the output voltage from the electrometer valve when the potential at that junction is below a predetermined value.

7. Apparatus as claimed in claim 3, in which there is provided timing means for determining the initial charging period of an insulated conductor under test, an electrometer valve, means for applying to said valve the potential at the junction between said conductor and said resistor, and switching means responsive to the electrometer valve output when that potential is above a predetermined value to connect the test voltage to the next conductor.

References Cited in the file of this patent
UNITED STATES PATENTS

| | | |
|---|---|---|
| 1,714,551 | Edwards | May 28, 1929 |
| 2,622,130 | Kabell | Dec. 16, 1952 |

UNITED STATES PATENT OFFICE

CERTIFICATE OF CORRECTION

September 3, 1957

Patent No. 2,805,391

Stanley George Meadows et al.

It is hereby certified that error appears in the printed specification of the above numbered patent requiring correction and that the said Letters Patent should read as corrected below.

Column 2, line 26, for "drawing" read -- drawings --; same line, for "represents" read -- represent --; column 3, line 9, strike out "wire"; line 44, for "equiment" read -- equipment --; column 4, line 14, for "electromotor" read -- electrometer --; line 15, for "resistor" read -- resistors --.

Signed and sealed this 29th day of October 1957.

(SEAL)
Attest:
KARL H. AXLINE
Attesting Officer

ROBERT C. WATSON
Commissioner of Patents